United States Patent
Shilane et al.

(10) Patent No.: US 10,331,561 B1
(45) Date of Patent: Jun. 25, 2019

(54) SYSTEMS AND METHODS FOR REBUILDING A CACHE INDEX

(71) Applicant: EMC Corporation, Hopkinton, MA (US)

(72) Inventors: Philip N. Shilane, Newton, PA (US); Grant R. Wallace, Pennington, NJ (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 15/196,150

(22) Filed: Jun. 29, 2016

(51) Int. Cl.
*G06F 12/00* (2006.01)
*G06F 13/00* (2006.01)
*G06F 13/28* (2006.01)
*G06F 12/0831* (2016.01)
*G06F 12/128* (2016.01)

(52) U.S. Cl.
CPC ........ *G06F 12/0831* (2013.01); *G06F 12/128* (2013.01); *G06F 2212/621* (2013.01); *G06F 2212/69* (2013.01)

(58) Field of Classification Search
CPC ............ G06F 3/00; G06F 3/06–3/0689; G06F 9/52–9/528; G06F 12/00–12/0692; G06F 12/08–12/0813; G06F 12/0815–12/0831; G06F 12/0833–12/0897; G06F 12/10–12/128; G06F 2201/00–2201/885; G06F 2206/00–2206/20; G06F 2209/52–2209/523; G06F 2211/00–2211/902; G06F 2212/00–2212/7211
See application file for complete search history.

(56) References Cited

U.S. PATENT DOCUMENTS

| | | | | |
|---|---|---|---|---|
| 4,513,367 A | * | 4/1985 | Chan | G06F 12/0817 711/124 |
| 4,785,395 A | * | 11/1988 | Keeley | G06F 12/0855 711/122 |
| 5,333,318 A | | 7/1994 | Wolf | |
| 5,590,320 A | * | 12/1996 | Maxey | G06F 3/0601 |
| 5,630,093 A | | 5/1997 | Holzhammer | |
| 5,644,701 A | * | 7/1997 | Takewaki | G06F 11/1407 711/144 |
| 5,682,497 A | | 10/1997 | Robinson | |
| 5,684,976 A | * | 11/1997 | Soheili-Arasi | G06F 12/0864 711/118 |
| 5,740,349 A | | 4/1998 | Hasbun | |

(Continued)

OTHER PUBLICATIONS

A DRAM-flash index for native flash file systems; Ho et al.; 2013 International Conference on Hardware/Software Codesign and System Synthesis, pp. 1-10; Sep. 29, 2013-Oct. 4, 2013 (Year: 2013).*

(Continued)

*Primary Examiner* — Daniel C. Chappell
(74) *Attorney, Agent, or Firm* — Workman Nydegger

(57) ABSTRACT

Systems and methods for rebuilding an index for a flash cache are provided. The index is rebuilt by reading headers of containers stored in the cache and inserting information from the headers into the index. The index is enabled while being rebuild such that lookup operations can be performed using the index even when the index is incomplete. New containers can be inserted into used or unused regions of the cache while the index is being rebuilt.

20 Claims, 3 Drawing Sheets

(56) References Cited

U.S. PATENT DOCUMENTS

| | | | |
|---|---|---|---|
| 5,761,501 A | 6/1998 | Lubbers | |
| 5,838,614 A | 11/1998 | Estakhri | |
| 5,907,856 A | 5/1999 | Estakhri | |
| 5,909,694 A * | 6/1999 | Gregor | G06F 12/0864 711/128 |
| 5,913,226 A * | 6/1999 | Sato | G06F 12/0833 711/141 |
| 5,966,726 A * | 10/1999 | Sokolov | G06F 3/0676 711/113 |
| 6,046,936 A | 4/2000 | Tsujikawa | |
| 6,049,672 A * | 4/2000 | Shiell | G06F 8/66 711/102 |
| 6,119,209 A | 9/2000 | Bauman | |
| 6,128,623 A | 10/2000 | Mattis | |
| 6,192,450 B1 | 2/2001 | Bauman | |
| 6,216,199 B1 | 4/2001 | DeKoning | |
| 6,272,593 B1 * | 8/2001 | Dujari | G06F 21/51 707/999.01 |
| 6,360,293 B1 | 3/2002 | Unno | |
| 6,510,083 B1 | 1/2003 | See | |
| 6,594,723 B1 | 7/2003 | Chapman | |
| 6,636,950 B1 * | 10/2003 | Mithal | G06F 9/3004 711/117 |
| 6,807,615 B1 * | 10/2004 | Wong | G06F 5/10 710/52 |
| 6,851,015 B2 | 2/2005 | Akahane | |
| 6,901,499 B2 | 5/2005 | Aasheim | |
| 6,965,970 B2 * | 11/2005 | Mosur | G06F 12/0804 711/118 |
| 6,978,342 B1 | 12/2005 | Estakhri | |
| 7,290,109 B2 | 10/2007 | Horil | |
| 7,433,245 B2 | 10/2008 | Otsuka | |
| 7,472,205 B2 * | 12/2008 | Abe | H04L 29/06 710/22 |
| 7,533,214 B2 | 5/2009 | Aasheim | |
| 7,640,262 B1 * | 12/2009 | Beaverson | G06F 17/30327 |
| 7,673,099 B1 * | 3/2010 | Beaverson | G06F 12/0866 711/118 |
| 7,702,628 B1 | 4/2010 | Luchangco | |
| 7,711,923 B2 | 5/2010 | Rogers | |
| 7,720,892 B1 * | 5/2010 | Healey, Jr. | G06F 11/1456 707/812 |
| 7,930,559 B1 * | 4/2011 | Beaverson | G06F 11/1453 711/111 |
| 7,996,605 B2 | 8/2011 | Koga | |
| 8,300,465 B2 | 10/2012 | Jeon | |
| 8,533,395 B2 * | 9/2013 | O'Connor | G06F 12/126 711/118 |
| 8,583,854 B2 | 11/2013 | Ji | |
| 8,606,604 B1 | 12/2013 | Huber | |
| 8,634,248 B1 | 1/2014 | Sprouse | |
| 8,688,650 B2 | 4/2014 | Mutalik | |
| 8,688,913 B2 * | 4/2014 | Benhase | G06F 12/0811 711/113 |
| 8,738,841 B2 | 5/2014 | Olbrich | |
| 8,738,857 B1 * | 5/2014 | Clark | G06F 12/0871 711/118 |
| 8,793,543 B2 | 7/2014 | Tai | |
| 8,811,074 B2 | 8/2014 | Goss | |
| 8,817,541 B2 | 8/2014 | Li | |
| 8,904,117 B1 * | 12/2014 | Kalekar | G06F 12/0804 711/119 |
| 8,910,020 B2 | 12/2014 | Frayer | |
| 8,917,559 B2 | 12/2014 | Bisen | |
| 8,935,446 B1 | 1/2015 | Shilane | |
| 8,943,282 B1 * | 1/2015 | Armangau | G06F 17/30088 711/126 |
| 9,026,737 B1 * | 5/2015 | Armangau | G06F 12/0822 711/118 |
| 9,043,517 B1 | 5/2015 | Sprouse | |
| 9,098,420 B2 * | 8/2015 | Bulut | G06F 12/0866 |
| 9,135,123 B1 * | 9/2015 | Armangau | G06F 11/1471 |
| 9,152,496 B2 | 10/2015 | Kanade | |
| 9,171,629 B1 | 10/2015 | Kokubun | |
| 9,189,402 B1 * | 11/2015 | Smaldone | G06F 12/121 |
| 9,189,414 B1 | 11/2015 | Shim | |
| 9,213,642 B2 * | 12/2015 | Chiu | G06F 11/2043 |
| 9,274,954 B1 * | 3/2016 | Bairavasundaram | G06F 12/0806 |
| 9,281,063 B2 | 3/2016 | Xiang | |
| 9,313,271 B2 * | 4/2016 | Venkat | G06F 12/0877 |
| 9,317,218 B1 * | 4/2016 | Botelho | G06F 3/0655 |
| 9,436,403 B1 | 9/2016 | Zhang | |
| 9,442,662 B2 | 9/2016 | Dancho | |
| 9,442,670 B2 | 9/2016 | Kruger | |
| 9,524,235 B1 | 12/2016 | Sprouse | |
| 9,535,856 B2 * | 1/2017 | Coronado | G06F 12/1491 |
| 9,697,267 B2 | 7/2017 | Kadayam | |
| 9,703,816 B2 | 7/2017 | George | |
| 9,811,276 B1 | 11/2017 | Taylor | |
| 9,870,830 B1 | 1/2018 | Jeon | |
| 9,952,769 B2 | 4/2018 | Badam | |
| 9,959,058 B1 | 5/2018 | O'Brien | |
| 10,002,073 B2 | 6/2018 | Cai | |
| 10,089,025 B1 | 10/2018 | Wallace et al. | |
| 2001/0029564 A1 | 10/2001 | Estakhri | |
| 2003/0009623 A1 * | 1/2003 | Arimilli | G06F 12/0813 711/119 |
| 2003/0009637 A1 * | 1/2003 | Arimilli | G06F 12/0817 711/144 |
| 2003/0009639 A1 * | 1/2003 | Arimilli | G06F 12/0813 711/146 |
| 2003/0009641 A1 * | 1/2003 | Arimilli | G06F 12/0817 711/147 |
| 2003/0009643 A1 * | 1/2003 | Arimilli | G06F 12/0813 711/155 |
| 2003/0217227 A1 * | 11/2003 | Parthasarathy | G06F 8/66 711/118 |
| 2004/0123270 A1 | 6/2004 | Zhuang | |
| 2005/0120180 A1 * | 6/2005 | Schornbach | G06F 17/30902 711/133 |
| 2005/0165828 A1 | 7/2005 | Lango | |
| 2006/0015768 A1 * | 1/2006 | Valine | G06F 11/073 714/5.1 |
| 2006/0059171 A1 * | 3/2006 | Borthakur | G06F 17/30067 |
| 2006/0101200 A1 * | 5/2006 | Doi | G06F 3/0611 711/113 |
| 2006/0143390 A1 * | 6/2006 | Kottapalli | G06F 12/084 711/130 |
| 2006/0179174 A1 * | 8/2006 | Bockhaus | G06F 12/126 710/22 |
| 2006/0184744 A1 * | 8/2006 | Langston | G06F 12/0811 711/141 |
| 2007/0005928 A1 * | 1/2007 | Trika | G06F 12/0246 711/202 |
| 2007/0061504 A1 | 3/2007 | Lee | |
| 2007/0156842 A1 | 7/2007 | Vermeulen | |
| 2007/0180328 A1 | 8/2007 | Cornwell | |
| 2007/0300037 A1 | 12/2007 | Rogers | |
| 2008/0046655 A1 * | 2/2008 | Bhanoo | G06F 17/30902 711/133 |
| 2008/0065809 A1 | 3/2008 | Eichenberger | |
| 2008/0077782 A1 * | 3/2008 | Lataille | G06F 9/30145 712/244 |
| 2008/0120469 A1 * | 5/2008 | Kornegay | G06F 12/122 711/133 |
| 2008/0147714 A1 | 6/2008 | Breternitz | |
| 2008/0177700 A1 * | 7/2008 | Li | G06F 17/30312 |
| 2008/0183955 A1 | 7/2008 | Yang | |
| 2008/0263114 A1 | 10/2008 | Nath | |
| 2008/0266962 A1 | 10/2008 | Jeon | |
| 2008/0273400 A1 | 11/2008 | La Rosa | |
| 2008/0313132 A1 | 12/2008 | Hao | |
| 2009/0063508 A1 | 3/2009 | Yamato | |
| 2009/0216788 A1 * | 8/2009 | Rao | G06F 17/30233 |
| 2009/0222626 A1 * | 9/2009 | Ingle | G06F 12/121 711/133 |
| 2009/0240871 A1 * | 9/2009 | Yano | G06F 12/0246 711/103 |
| 2009/0300265 A1 | 12/2009 | Vyssotski | |

(56) References Cited

U.S. PATENT DOCUMENTS

| | | | |
|---|---|---|---|
| 2010/0023697 A1* | 1/2010 | Kapoor | G11C 29/52 711/128 |
| 2010/0070715 A1* | 3/2010 | Waltermann | G06F 12/0868 711/129 |
| 2010/0082886 A1 | 4/2010 | Kwon | |
| 2010/0115182 A1 | 5/2010 | Murugesan | |
| 2010/0165715 A1 | 7/2010 | Donze | |
| 2010/0185807 A1 | 7/2010 | Meng | |
| 2010/0199027 A1 | 8/2010 | Pucheral | |
| 2010/0211744 A1* | 8/2010 | Morrow | G06F 12/0831 711/128 |
| 2010/0229005 A1 | 9/2010 | Herman | |
| 2010/0306448 A1* | 12/2010 | Chen | G06F 12/0804 711/103 |
| 2010/0332952 A1 | 12/2010 | Chung | |
| 2011/0010698 A1 | 1/2011 | Byom | |
| 2011/0022778 A1 | 1/2011 | Schibilla | |
| 2011/0072217 A1* | 3/2011 | Hoang | G06F 17/30312 711/130 |
| 2011/0138105 A1 | 6/2011 | Franceschini | |
| 2011/0138132 A1* | 6/2011 | Brueggen | G06F 12/0831 711/146 |
| 2011/0153953 A1* | 6/2011 | Khemani | G06F 12/0895 711/136 |
| 2011/0225141 A1* | 9/2011 | Chaudhry | G06F 17/30132 707/709 |
| 2011/0264865 A1* | 10/2011 | Mobarak | G06F 12/121 711/141 |
| 2011/0276780 A1 | 11/2011 | Sengupta | |
| 2011/0276781 A1 | 11/2011 | Sengupta | |
| 2011/0296110 A1 | 12/2011 | Lilly | |
| 2012/0054414 A1 | 3/2012 | Tsai | |
| 2012/0084484 A1 | 4/2012 | Post | |
| 2012/0102268 A1* | 4/2012 | Smith | G06F 11/2089 711/113 |
| 2012/0110247 A1 | 5/2012 | Eleftheriou | |
| 2012/0215970 A1* | 8/2012 | Shats | G06F 12/0866 711/103 |
| 2012/0275466 A1 | 11/2012 | Bhadra | |
| 2013/0036418 A1 | 2/2013 | Yadappanavar | |
| 2013/0103911 A1* | 4/2013 | Bulut | G06F 12/0866 711/144 |
| 2013/0205089 A1* | 8/2013 | Soerensen | G06F 12/0811 711/122 |
| 2013/0282964 A1* | 10/2013 | Sengupta | G06F 12/0866 711/103 |
| 2013/0325817 A1 | 12/2013 | Whitehouse | |
| 2013/0339576 A1* | 12/2013 | Liu | G06F 12/0246 711/103 |
| 2014/0013027 A1 | 1/2014 | Jannyavula Venkata | |
| 2014/0098619 A1 | 4/2014 | Nazarian | |
| 2014/0122818 A1 | 5/2014 | Hayasaka | |
| 2014/0136762 A1 | 5/2014 | Li | |
| 2014/0143505 A1 | 5/2014 | Sim | |
| 2014/0149401 A1 | 5/2014 | Liu | |
| 2014/0173330 A1* | 6/2014 | Samanta | G06F 11/1666 714/4.11 |
| 2014/0215129 A1 | 7/2014 | Kuzmin | |
| 2014/0281167 A1 | 9/2014 | Danilak | |
| 2014/0281824 A1 | 9/2014 | Oh | |
| 2015/0127889 A1 | 5/2015 | Hwang | |
| 2015/0205722 A1* | 7/2015 | Chiu | H04L 67/2842 714/4.11 |
| 2015/0277786 A1 | 10/2015 | Rostock | |
| 2015/0331807 A1* | 11/2015 | Lie | G06F 12/1009 711/118 |
| 2015/0347291 A1 | 12/2015 | Choi | |
| 2015/0363285 A1 | 12/2015 | Delaney | |
| 2016/0041927 A1* | 2/2016 | Jung | G06F 12/0864 711/135 |
| 2016/0147669 A1* | 5/2016 | Huang | G06F 12/0864 711/128 |
| 2016/0274819 A1 | 9/2016 | Choi | |
| 2017/0060439 A1 | 3/2017 | Harawasa | |
| 2017/0091054 A1 | 3/2017 | Delaney | |

OTHER PUBLICATIONS

A sequential indexing scheme for flash-based embedded systems; Yin et al.; Proceedings of the 12th International Conference on Extending Database Technology: Advances in Database Technology, pp. 588-599; Mar. 24-26, 2009 (Year: 2009).*

FlashStore: high throughput persistent key-value store; Debnath et al.; Proceedings of the VLDB Endowment, vol. 3, iss. 1-2, pp. 1414-1425; Sep. 2010 (Year: 2010).*

SkimpyStash: RAM space skimpy key-value store on flash-based storage; Debnath et al.; Proceedings of the 2011 ACM SIGMOD International Conference on Management of data, pp. 25-36; Jun. 12-16, 2011 (Year: 2011).*

History-aware page replacement algorithm for NAND flash-based consumer electronics; Lin etal.; IEEE Transactions on Consumer Electronics, vol. 62, iss. 1; Feb. 2016; pp. 23-39 (Year: 2016).

A novel hot data identification mechanism for NAND flash memory; Liu et al.; IEEE Transactions on Consumer Electronics, vol. 61, iss. 4; Nov. 2015; pp. 463-469 (Year: 2015).

Hot data identification for flash-based storage systems using multiple bloom filters; Park et al.; 27th Symposium on Mass Storage Systems and Technologies; May 23-27, 2011 (Year: 2011).

BloomFlash: Bloom Filter on Flash-Based Storage; Debnath et al.; 2011 31st International Conference on Distributed Computing Systems; Jun. 20-24, 2011; pp. 635-644 (Year: 2011).

NAND Flash Memory: Challenges and Opportunities; Li et al; IEEE Computer, vol. 46, iss. 8; Aug. 2013; pp. 23-29 (Year: 2013).

Dysource: a high performance and scalable NAND flash controller architecture based on source synchronous interface; Wu et al; Proceedings of the 12th ACM International Conference on Computing Frontiers, Article No. 25; May 18-21, 2015 (Year: 2015).

Hardware/software architecture for flash memory storage systems; Min et al; Proceedings of the 14th international conference on Compilers, architectures and synthesis for embedded systems; Oct. 9-14, 2011; pp. 235-236 (Year: 2011).

A self-adjusting flash translation layer for resource-limited embedded systems; Wu, Chin-Hsien; ACM Transactions on Embedded Computing Systems, vol. 9, iss. 4, Article No. 31; Mar. 2010 (Year: 2010).

DHash: A cache-friendly TCP lookup algorithm for fast network processing; Zhang et al; 38th Conference on Local Computer Networks; Oct. 21-24, 2013; pp. 484-491 (8 pages) (Year: 2013).

A comparison of adaptive radix trees and hash tables; Alvarez et al; 31st International Conference on Data Engineering; Apr. 13-17, 2015; pp. 1227-1238 (12 pages) (Year: 2015).

A Workload-Aware Adaptive Hybrid Flash Translation Layer with an Efficient Caching Strategy; Park et al; 19th International Symposium on Modeling, Analysis & Simulation of Computer and Telecommunication Systems; Jun. 25-27, 2011; pp. 248-255 (8 pages) (Year: 2011).

B-tree indexes and CPU caches; Graefe et al; 17th International Conference on Data Engineering; Apr. 2-6, 2001; pp. 349-358 (10 pages) (Year: 2001).

U.S. Appl. No. 15/196,110, filed Jun. 29, 2016, Wallace, et al.
U.S. Appl. No. 15/196,163, filed Jun. 29, 2016, Wallace, et al.
U.S. Appl. No. 15/196,196, filed Jun. 29, 2016, Wallace, et al.
U.S. Appl. No. 15/196,261, filed Jun. 29, 2016, Shilane, et al.
U.S. Appl. No. 15/196,283, filed Jun. 29, 2016, Shilane, et al.

CAFTL: A Content-Aware Flash Translation Layer Enhancing the Lifespan of Flash Memory based Solid State Drives; Chen et al; Proceedings of the 9th USENIX conference on File and storage technologies; Feb. 15-17, 2011; retrieved from Proceedings of the 9th USENIX conference on File and storage technologies on Jul. 15, 2017 (14 pages).

A Forest-structured Bloom Filter with flash memory; Lu et al; IEEE 27th Symposium on Mass Storage Systems and Technologies; May 23-27, 2011 (6 pages).

(56) References Cited

OTHER PUBLICATIONS

Algorithms in Java, Third Edition; Sedgewick, Robert; ISBN 0-201-36120-5; 2003; pp. 91-94 (4 pages).
Skip lists: a probabilistic alternative to balanced trees; Pugh, William; Communications of the ACM, vol. 33, iss. 6; 6/19990; pp. 668-676 (9 pages).
U.S. Appl. No. 16/049,891, filed Jul. 31, 2018, Wallace, et al.
U.S. Appl. No. 16/103,499, filed Aug. 14, 2018, Wallace, et al.
U.S. Appl. No. 16/146,584, filed Sep. 28, 2018, Wallace, et al.

* cited by examiner

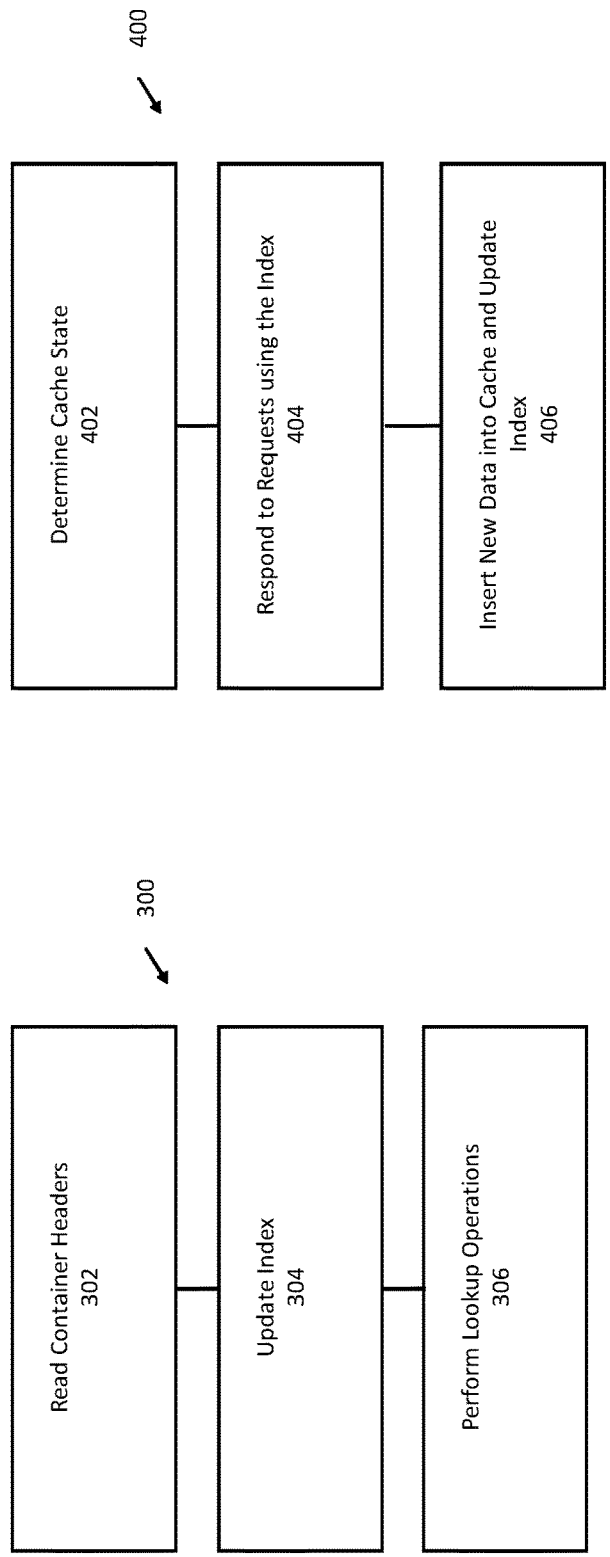

SYSTEMS AND METHODS FOR REBUILDING A CACHE INDEX

FIELD OF THE INVENTION

Embodiments of the invention relate to systems and methods for managing memory in a computing environment. More particularly, embodiments of the invention relate to systems and methods for rebuilding an index to data stored in a cache such as a flash cache.

BACKGROUND

Advances in computing technology has resulted in the ability to store ever growing amounts of data. However, the performance of data storage systems is often limited by hard disk drive (HDD) latency, which has been relatively constant for years. To improve performance, data storage systems use caching layers. Typically, each caching layer performs better than the lower layer.

In systems that deal with large amounts of data, flash memory can be used as a caching layer and can be much larger than DRAM (dynamic random access memory). In fact, caches configured from flash memory (flash cache) may be very large (e.g., hundreds of gigabytes to hundreds of terabytes in size). Flash memory has both higher IOPS (input output operations per second) and lower latency compared to HDDs.

The performance of a storage system can be improved by placing the most valuable data or metadata into the flash cache for faster access. Unlike DRAM, flash is persistent across system restarts. Consequently, content stored in the flash cache is not lost when a system restarts and the contents can be advantageously used. This is referred to as a warm cache and is distinct from starting with a cold cache that needs to be repopulated with data.

However, an index is needed to access the contents of the flash cache. The index is usually stored in memory such as DRAM and maps an identifier (e.g., a fingerprint, hash, key, or the like) to a location in the flash cache. The data stored in the flash cache may be data such as file blocks, content-defined chunks, or meta-data such as directory records, file indirect blocks, or the like. Because the index in DRAM is lost across restarts, it is necessary to rebuild the index before the content of the flash cache can be used.

The index could be stored in the flash cache instead of memory. When the index is stored in the flash cache, it may not be necessary to rebuild the index or load the index into memory. A drawback of this approach is that the index has to be kept up-to-date in the flash cache. This has the effect of causing high churn in the flash cache and can have an impact on the performance of the flash cache. Flash has a limited endurance and only supports a limited number of writes before it becomes read-only. As one example, consider a flash device of 100 GB that only supports one full overwrite per day for five years. That means it supports 100 GB times 356 days times 1 write per day times five years, which approximately equals 178 TB of writes before it becomes read-only. Frequent index updates can use up the writes supported by the flash device. Additionally updates to the index are usually very small, such as only a few bytes, but flash updates are at the unit of a page, usually 4 KB, requiring a page to be read, modified and written to a new location for each small update.

In another example, the flash cache can be completely scanned and the index can be rebuilt in memory from the scan. Reading the entire cache, however, requires a lot of time (depending on the size of the cache) and consumes I/O that could be used for other purposes. This is expensive and can negatively impact the performance of the flash cache. Systems and methods are needed for building or for rebuilding an index for a flash cache.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 3 illustrates an example method for rebuilding an index; and

FIG. 4 illustrates an example method for inserting data segments into the flash cache.

DETAILED DESCRIPTION OF SOME EXAMPLE EMBODIMENTS

Figure 1:
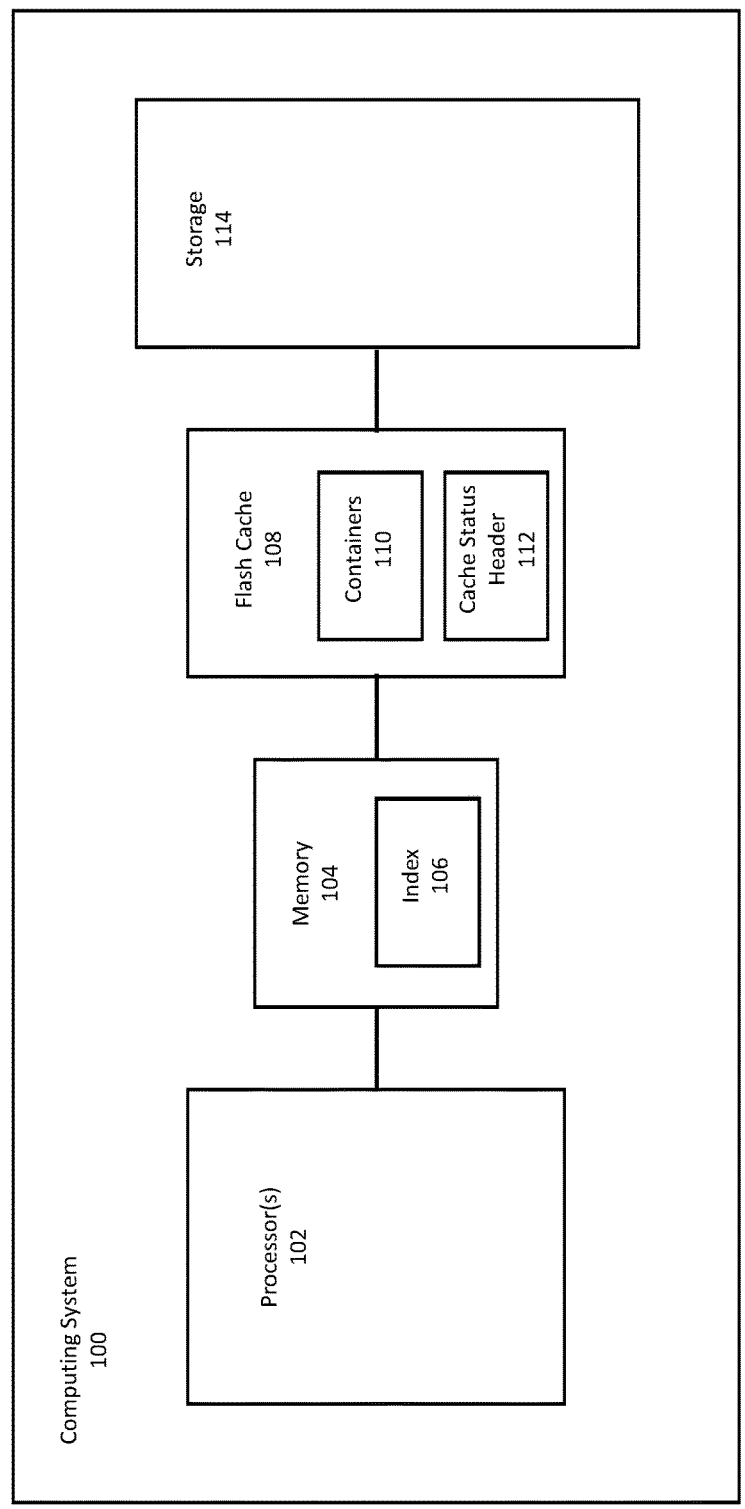
FIG. 1 illustrates an example of a computing environment that includes an index used to access the content of a flash cache.

Embodiments of the invention relate to systems and methods for managing memory in a computing system. More particularly, embodiments of the invention relate to systems and methods for building or rebuilding indexes used to access content in a cache such as a flash cache.

A computing system may include multiple or tiered storage. The different tiers may include different types of storage. A computing system may include DRAM, a flash memory cache (flash or flash cache), and storage such as hard disk drives (HDD). The content stored in the flash cache is accessed using an index that maps an identifier of the content or data to a location of the data in the cache. In one example, the identifier may identify a location of the data in a container stored in the cache. A container is an example of a structure to store multiple data segments.

Unlike DRAM, flash is persistent across system restarts, so when a storage system restarts, the content in the flash cache can be used. This allows the storage system to start with a warm cache instead of starting from a cold cache that has to be repopulated. However, the index to the cache, which was stored in memory, is typically lost and must be rebuilt.

Embodiments of the invention relate to systems and methods for rebuilding or reconstructing the index when the flash cache is loaded. In one example, the process of rebuilding the cache is improved by managing the manner in which content is stored in the cache. More specifically, the data may be arranged or stored in containers. Each container includes a header that includes enough metadata to index the content of the container. As a result, the process of rebuilding the index is improved because it is only necessary to read the headers of the containers when rebuilding the cache. In addition, the container headers in the flash cache can be read using multiple parallel threads. The order of reading from the flash cache has little impact on the index because the index stores relationships between an identifier of the data (a data segment) and a location of the data segment in the flash cache and more specifically to a location of the data segment in a container in the cache. The index may also store other data or metadata. Even if the flash cache includes multiple flash devices, one or more threads can be created to read from each device independently and add entries to the index.

Further, multiple threads can be used to read from a single flash device when the flash device supports multiple outstanding I/Os. Each thread, for example, may be configured to read a distinct set of container identifiers (IDs). Reading the flash cache using multiple threads can shorten the time required to rebuild the index. When rebuilding the flash cache using multiple threads, the index or subregions of the index may be locked as necessary to avoid conflicting updates.

Traditionally, a cache is not available until the index is fully reconstructed. Embodiments of the invention, however, allow access to the cache even when the index is not fully reconstructed. In this scenario, some requests to the index may fail to find data that is actually located in the flash cache. However, more of the data becomes available over time as the index is built. In addition, content can be inserted into the flash cache while the index is being rebuilt. Insertions are simply added to the index.

To facilitate the process of rebuilding the cache, an overall cache state may be stored in a reserved region of the flash cache. The cache state may be referred to as a cache status header. The cache status header may include the highest container ID stored to flash as well as an allocation table indicating which regions of flash cache have containers and which regions of the flash cache are unused. When a client inserts new content into the flash cache, the content is packed into a new container (or multiple containers if necessary), the container's header is created representing the container, a new container ID is created, the container is written to flash, and the content is added to the index. The content is added to the index by adding at least an identifier (e.g., a key, a hash or partial identifier of the content) and a location of the data segment. The location may specify the container plus an offset within the container where the content or data segment is stored.

During the rebuild process, the location in the flash cache in which the container is written can be selected in different ways. If unused regions are available in the flash cache, the container may be written to an unused region. If a region of the flash cache is used but not yet indexed, this region can be selected for replacement without reading the container's header and without removing entries from the index. If a region that is used and indexed is selected, the region can be selected for replacement.

Various policies can be used to manage the content in the cache. Least recently used (LRU) is an example of a policy for evicting content from the cache. Thus, content can be added to the cache in parallel with the reconstruction of the index.

FIG. 1 illustrates an example of a computing system 100. The computing system 100 may be implemented as an integrated device or may include multiple devices that are connected together using a network, bus, or other suitable connection (wired and/or wireless). The computing system 100 may be configured to perform a special purpose. For example, the computing system 100 may be configured to perform data protection operations. Example data protection operations include, but are not limited to, backing up data from one or more clients, restoring data to one or more clients, de-duplicating data backed up in the computing system, indexing data stored in the computing system, optimizing the data stored in the computing system, reading a cache, writing to a cache, rebuilding an index to a cache, or the like or combination thereof.

The computing system 100 may include a processor 102 (or multiple processors), a memory 104, a flash cache 108 (or other suitable memory type), and storage 114. The memory 104 and the flash cache 108 may both be configured as a cache. The memory 104, for example, may be DRAM or the like. The memory 104 is typically faster and smaller than the flash cache 108. The flash cache 108 is typically smaller and faster than the storage 114. The storage 114 may include multiple HDDs or other storage type.

The memory 104, flash cache 108, and storage 114 are arranged to improve performance of the computing system 100. Over time, by way of example, data that is requested more frequently tends to reside in the flash cache 108.

In the computing system 100, an index 106 is maintained in the memory 104. The index 106 includes multiple entries and each entry corresponds to data or content stored in the flash cache 108. In one example, the index 106 may be implemented as a hash index. The hash in an entry of the index is an identifier of content in the flash cache 108 corresponding to the entry. In one example, the index 106 may not store the complete identifier. The index 106 may include identifiers of data or content stored in the flash cache 108. Each entry in the index 106 may also store other information or metadata such as a segment size, segment type, or the like or other combination thereof. In another example, the metadata in the index may be a logical block address or file handle and offset within a file.

The content in the flash cache 108 may be stored in containers 110. Each of the containers 110 may include a container header. The container header contains enough metadata to index the content stored in the corresponding container. Each container may include multiple segments. When rebuilding the index, the container headers may be read and entries in the index 106 may be generated from the metadata in the container header. More specifically, each container may include multiple data segments. The container header may include the identifier and location of each data segment in the container. The container header may also identify a segment type and a segment size for each data segment. By reading the container headers, all information needed to index each of the data segments can be obtained without having to read or process the data segments themselves.

A cache status header 112 may also be stored in the flash cache 108. The cache status header 112 may be stored at a known location such that information contained therein can be extracted across restarts without having to search for the cache status header.

The cache status header 112 may include information that can be used at least when the index is being rebuilt. For example, the cache status header 112 may identify the highest container identifier included in the containers 110. When rebuilding the index, the container headers can be read in parallel using multiple threads. Knowing the highest container identifier allows the computing system to know when all container headers have been read and allows the computing system to allocate a range of container headers to different threads. This eliminates redundancy when reading the container headers such that container headers are only read once.

The cache status header 112 may also identify regions of the flash cache 108 that are unused and/or regions that are used and/or regions recommended for replacement. This provides flexibility when inserting new content into the flash cache 108 while the index is being rebuilt.

Figure 2:
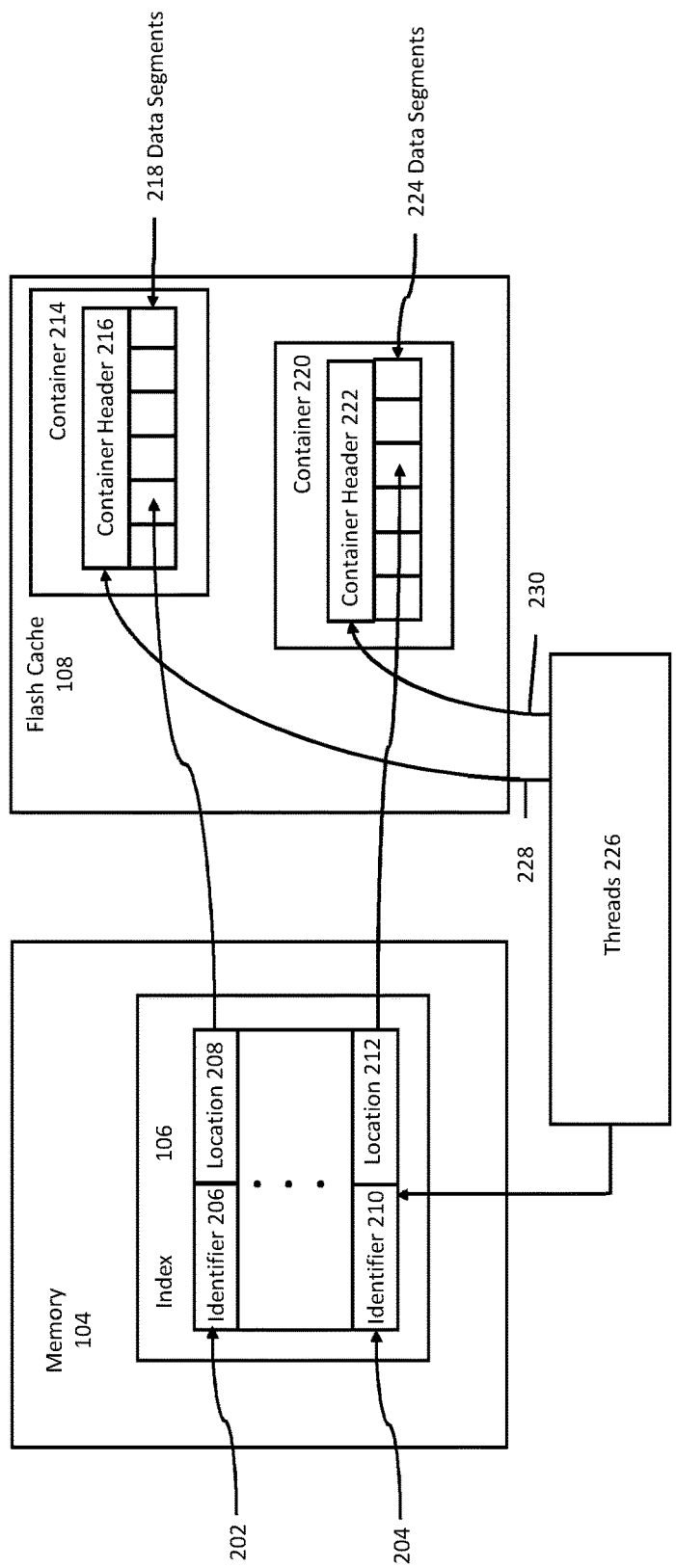
FIG. 2 illustrates an example of an index stored in a memory and illustrates a relationship between the index and content stored in the flash cache.

FIG. 2 illustrates the process of rebuilding an index in the computing system 100. In FIG. 2, the index 106 is rebuilt using threads 226 (e.g., the thread 228 and the thread 230, which represent multiple threads) or other suitable executable or process.

More specifically, the flash cache 108 includes, by way of example a container 214 and a container 220. In practice, the flash cache 108 includes a large number of containers. The container 214 includes a container header 216 and data segments 218. The container header 216 includes metadata that allows the data segments 218 to be indexed without having to read the data segments 218. The metadata includes information such as the identifiers the data segments and locations of the data segments in the container. This metadata can be used to rebuild the index. The container 220 similarly includes a container header 222 and corresponding data segments 224.

In one embodiments, the container headers can be read using multiple threads 226. In this example, the thread 228 reads the container header 216 and the thread 230 reads the container header 222. After reading the container headers 216 and 222, the threads 226 insert the metadata into the index 106.

The thread 228 is reading the container header 216 and the thread 230 is reading the container header 222. After reading the container header 216, at least an identifier 206 (e.g., a key, hash or fingerprint or partial identifier of the corresponding segment) and a location 208 is written to the entry 202 of the index 106. The location stored in the index 106 may be represented in different ways. The location 208, for example, may point to the container 214 and include an offset to the relevant segment. Alternatively, the location 208 could point directly to a particular segment. Similarly, an identifier 210 and a location 212 are written to the entry 204 of the index 106. Once this is completed, the containers 214 and 220 are indexed. The containers can be read in a parallel manner. A lock may be applied to the index 106 as necessary during index updates.

Until all of the containers have been indexed in this manner, the index 106 is only partially rebuilt. However, embodiments of the invention allow the index to be used in a partially reconstructed state. This allows the computing system to be used more quickly compared to waiting for the index to be completely rebuilt.

FIG. 3 illustrates an example of a method for rebuilding an index. The method 300 begins by reading container headers in box 302. Multiple threads may be used to read the container headers such that the container headers are read in parallel. When reading the container headers, the cache status header may be used to identify the number of container headers to be read. Further, different container identifiers are allocated to different threads. In this manner, the container headers can be read in parallel and, in one example, in sequence. Each thread may read a range of container headers.

In box 304, the index is updated by the threads. Because multiple threads are reading the container headers, the index or portions of the index may be locked during an update. This ensures that the in-memory index is locked as necessary. In one example, the index may include index buckets. Locking the index or locking a specific bucket can ensure that the updates are performed appropriately without different threads interfering with each others writes and potentially creating invalid index entries. Each index bucket may include multiple entries.

After a container has been indexed, the data segments associated with the container can be accessed via the cache. Thus, lookup operations can be performed in box 306. Stated differently, a request for a data segment that has been indexed allows the data segment to be retrieved from the flash cache even if the cache index is not completely rebuilt. A request for a data segment that has not been indexed may be retrieved from storage even if the requested data segment is stored in the flash cache. In other words, cache misses are handled normally in the computing system.

FIG. 4 illustrates an example of a method for inserting a data segment into the cache. FIG. 4 further illustrates an example of inserting a data segment into the cache while rebuilding the cache. The method 400 allows data segments to be inserted into the cache while the index is under construction. In box 402, the cache state is accessed to determine the highest container number and to identify unused regions of the flash cache. The cache state can be determined from the cache status header. The cache status header may store the highest container number presently stored in the cache and may identify unused regions of the flash cache. The cache status header may be read into memory for faster repeated access. This information can be used when inserting data segments into the flash cache.

In box 404, a request to insert a data segment is evaluated using the index. In one example, the request is evaluated to determine whether the index includes the data segment associated with the request. This may occur, for example, when the container containing the data segment has been indexed. In one example, an identifier of the requested data segment is compared with identifiers presently indexed. If the identifier is found, then the data segment is stored in the flash cache and has been indexed. The response to the request in box 404 may be to read the data segment from the flash cache.

In one example when the identifier is not in the index in box 404, the data segment may be inserted into the cache in box 406. The index may also be updated. The data segment can be inserted in different manners. In one example, the cache status header may be read to identify the highest container number and to obtain information about free space. Then, the data segment is written to a container (that is given the next container number) and the container is written to an unused region of the flash cache if an unused region is available.

In another example, the container containing the data segment can be written to a region of the flash cache that has been used but has not been indexed. In this example, the header of the container being replaced does not need to be read and no entries need to be removed from the index. Information for the new container, however, may be added to the index.

In another example, a region that is already indexed and used can be selected for the new data segment. The selection of the used region can be made using various caching eviction policies, such as least recently used, lowest container number, or the like.

This process may continue until the cache is rebuilt. Once the cache is rebuilt, normal caching policies may be performed.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, DRAM, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein. A controller may include a processor and memory and/or other computing chips.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for rebuilding an index for segments stored in a flash memory, the method comprising:
    when the index, which is stored in a memory, to the segments stored in the flash memory is lost or corrupted and the index is not backed up in the flash memory, rebuilding the index by:
        reading headers of containers stored in the flash memory, wherein the headers contain sufficient information to index the segments stored in the containers without accessing the segments stored in the containers;
        updating the index with information extracted from the headers, wherein the information includes identifiers of segments stored in the containers and locations of the segments in the containers; and
        performing lookup operations into the flash memory for segments while rebuilding the index, wherein the lookup operations are performed including when the index rebuild is in progress.

2. The method of claim 1, further comprising reading the headers of the containers with multiple threads.

3. The method of claim 2, further comprising locking the index or portions of the index as necessary while rebuilding the index with information obtained by the multiple threads.

4. The method of claim 1, wherein the identifiers comprise cryptographic hashes or keys or fingerprints.

5. The method of claim 1, further comprising inserting a data segment into the flash memory while rebuilding the index.

6. The method of claim 5, further comprising inserting the data segment into an unused region of the flash memory and updating the index for the newly inserted segment.

7. The method of claim 5, further comprising inserting the data segment into a used region of the flash memory that has not been indexed without reading headers of containers in the used region and without removing entries from the index.

8. The method of claim 5, further comprising inserting the data segment into a used region of the flash memory that has been indexed, wherein a data segment being replaced is evicted and the index updated to reflect the eviction.

9. The method of claim 5, further comprising inserting a container including the data segment into a used region of the flash memory that has been indexed, wherein a container being replaced is evicted and the index updated to reflect the eviction of all data segments included in the evicted container.

10. A method for inserting data segments into a flash memory while rebuilding an index for the flash memory, the method comprising:
    when the index, which is stored in a volatile memory, to the data segments stored in the flash memory is lost or corrupted and the index is not backed up in the flash memory, rebuilding the index of the flash memory in the volatile memory by:
        reading headers of containers stored in the flash memory and adding entries to the index based on the headers, wherein each of the entries includes at least an identifier of a segment and a location of the segment in the containers, wherein the headers contain sufficient information to index the segments stored in the containers without accessing the segments stored in the containers;

inserting a segment into the flash memory while rebuilding the index, wherein the segment is inserted into one of an unused region of the flash memory or a used region of the flash memory, wherein the insertion of the segment is performed even if the index rebuild is in progress; and updating the index to reflect the inserted segment.

11. The method of claim 10, wherein rebuilding the index includes reading the headers with multiple threads in parallel.

12. The method of claim 11, further comprising locking the index or a portion of the index as necessary when adding the entries to the index.

13. The method of claim 11, wherein each thread reads a subset of the containers.

14. The method of claim 10, further comprising determining a state of the flash memory from a flash memory status header, wherein the flash memory status header identifies a highest container identifier and an unused region of the flash memory.

15. The method of claim 14, wherein inserting a segment into the flash memory while rebuilding the index includes inserting the segment into the unused region of the flash memory or a used region of the flash memory.

16. The method of claim 15, further comprising adding the segment to a container and writing the container to the unused region and updating the index when inserting the segment into the unused region.

17. The method of claim 15, further comprising inserting the container into a portion of the used region that is not indexed without indexing any containers replaced during the insertion and without removing entries from the index.

18. The method of claim 15, further comprising inserting the container into a portion of the used region that is indexed, wherein any containers replaced by the insertion are selected by a caching strategy.

19. A computing system configured to cache data in a flash memory and configured to rebuild an index, the system comprising:

a flash memory configured to cache data segments, wherein the data segments are stored in containers in the flash memory;

a memory configured to store an index, wherein the index associates identifiers of the data segments with locations of the data segments in the flash memory; and a processor, the processor configured to execute computer executable instructions for performing a method for rebuilding the index, the method comprising:

when the index, which is stored in the memory, to the data segments stored in the flash memory is lost or corrupted and the index is not backed up in the flash memory, rebuilding the index in the memory by:

reading headers of the containers stored in the flash memory, wherein the header of each container includes metadata sufficient to index all data segments stored in the container without requiring the data segments stored in the containers to be accessed, wherein the metadata includes an identifier and a location;

updating the index using the metadata from the headers; and operating the flash memory in a normal manner while the index is being rebuilt, wherein operations in the flash memory are performed even when the index rebuild is in progress.

20. The computing system of claim 19, wherein the method further includes performing lookup operations using the flash memory while rebuilding the flash memory and inserting data segments into the flash memory while rebuilding the flash memory.

* * * * *